Figure 1:
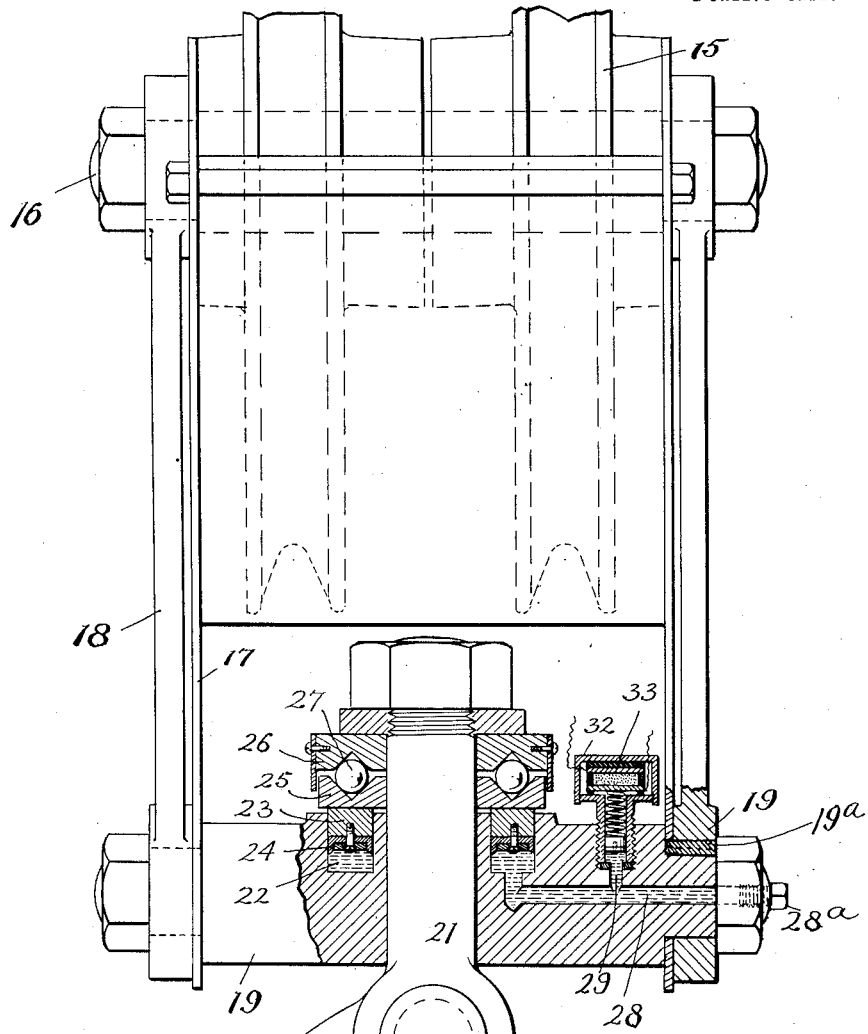

C. E. BEARD & W. G. STEPHAN.
HOIST BLOCK.
APPLICATION FILED MAY 15, 1911. RENEWED JUNE 29, 1915.

1,214,745.

Patented Feb. 6, 1917.
2 SHEETS—SHEET 1.

C. E. BEARD & W. G. STEPHAN.
HOIST BLOCK.
APPLICATION FILED MAY 15, 1911. RENEWED JUNE 29, 1915.

1,214,745.

Patented Feb. 6, 1917.
2 SHEETS—SHEET 2.

Witnesses
E. B. Hilchrist
H. R. Sullivan

Inventors.
Clement E. Beard
Walter G. Stephan
by Thurston & Kwis — Attys.

UNITED STATES PATENT OFFICE.

CLEMENT E. BEARD, OF COLUMBIANA, AND WALTER G. STEPHAN, OF CLEVELAND, OHIO.

HOIST-BLOCK.

1,214,745.

Specification of Letters Patent.

Patented Feb. 6, 1917.

Application filed May 15, 1911, Serial No. 627,111. Renewed June 29, 1915. Serial No. 37,118.

*To all whom it may concern:*

Be it known that we, CLEMENT E. BEARD and WALTER G. STEPHAN, citizens of the United States, and residents, respectively, of Columbiana, in the county of Columbiana and State of Ohio, and Cleveland, in the county of Cuyahoga and State of Ohio, have invented a certain new and useful Improvement in Hoist-Blocks, of which the following is a full, clear, and exact description.

This invention relates to improvements in hoist blocks and especially to means whereby the weight of the load carried at any time by the block can be indicated or measured, the present invention being a modification of and in certain aspects an improvement over the construction disclosed in the patent for hoist block, granted to W. G. Stephan, (one of the present joint inventors), Serial No. 912,434, Feb. 16th, 1909. In the patent to Stephan above mentioned, there is disclosed a hoist block having as a part thereof a weight indicating device which will at all times indicate the load supported on the hook of the block, this arrangement and construction having a marked advantage over the weighing devices employed prior to the Stephan invention, in the respect that the weighing device as it forms a permanent part of the block is always ready for use, and does not obstruct or interfere in any way with the hook, while on the other hand, the prior weighing devices were designed to be attached to the hook and were used only at intervals or when necessity demanded. As a matter of fact, the devices previously employed could not in most cases be kept on the hook of the block continually, in view of the space which they occupy and in view of the fact that the amount of head room occupied by the hoisting apparatus with the weighing device attached was often too great to permit of their use.

The object of the present invention is to provide a hoist block with a weight indicating or measuring means permanently associated with the block (although not necessarily attached directly thereto) which is always ready for use, and as in the Stephan construction, does away with the necessity for the separate weighing device which is at times attached to the hook of the block when a weight is to be indicated and at other times is detached from the hook and not in position for use.

Further, the invention aims to provide a weight indicating means, preferably electrically operated, which while employing some of the features of the Stephan construction, has the advantage that the weight indicator itself may be located at any desired point,— on the block or at a point remote from the block, such as in the cab or station occupied by the operator of the hoisting and conveying mechanism.

These and other objects are accomplished by our invention which may be briefly summarized as consisting in certain novel details of construction and combinations and arrangements of parts which will be described in the specification and set forth in the appended claims.

Figure 2:
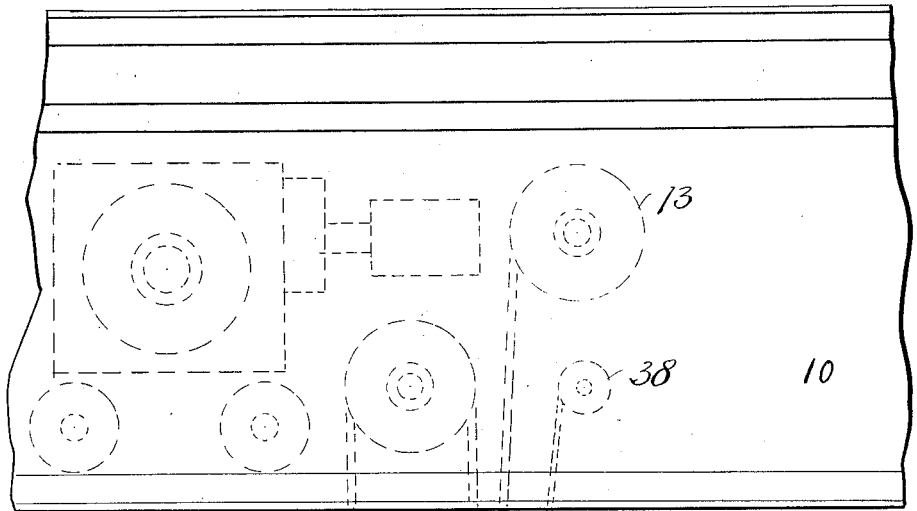
Figure 2:
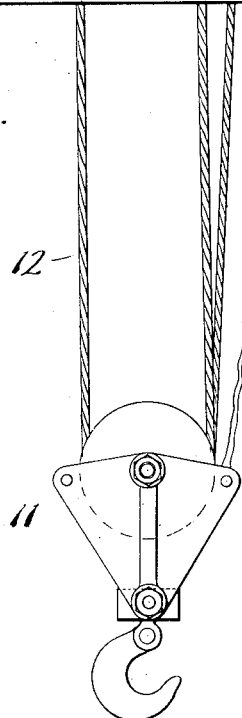
Figure 3:
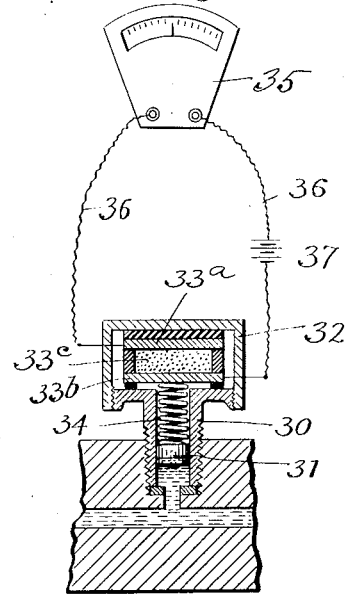

In the accompanying sheets of drawings, Figure 1 is an enlarged elevation with certain portions in section of a hoist block constructed in accordance with our invention; Fig. 2 is an elevation showing the block swinging from a traveling crane; and Fig. 3 is a conventional representation, showing the weighing instrument and a portion of the block including the variable resistance device carried thereby and also showing the electric circuit of the measuring instrument.

In the drawings, 10 represents a crane from which the block 11 is swung or supported by means of a hoisting cable 12 which passes about the sheaves of the block and the sheaves carried by the crane and is adapted to be wound on and unwound from a suitable drum 13. The block itself includes one or more sheaves 15, any number of which may be provided which are adapted to receive the hoisting cable 12 in the usual manner, and which are mounted on a stud 16. The block also includes cheek plates 17, and vertical bars or straps 18 which extend from the upper sheave supporting stud 16 to a lower stud or bar 19 which supports the load supporting hook 20. In this case, the bar 19 is held from rotary movement in the cheek plates 17 and straps 18 by some such means as keys 19ª, one of which is shown in Fig. 1. The hook 20 has a pivotal connection with a stem 21 which passes loosely through a central perforation in the bar 19, so that it may readily turn therein. The bar 19 is provided concentrically with respect to the opening through which the stem 21 extends with an annular well 22, which is adapted to contain a suitable liquid, and which receives an annular piston 23 provided on its lower face with flexible packing, indicated at 24. This piston 23 sustains a centrally perforated bearing disk 25 having on its upper face an annular bearing groove, and arranged above the disk 25 is a similar disk 26, having on its lower face a complementary bearing groove which together with the groove in the lower disk constitute a race containing a series of anti-friction bearings 27 which permit the upper disk to turn readily with respect to the lower disk.

From the annular well 22, there extends axially of the bar 19 a passageway 28 which being in direct communication with the well 22, is adapted also to be filled with the liquid. This passageway 28 preferably extends to the end of the bar and is closed at its outer end by a suitable plug 28ª. From the passageway 28 a second passageway 29 extends upwardly, the top of this passageway being relatively larger than the lower part which communicates with the lower passageway 28. Inserted into the upper part of the passageway 29 is a bushing 30 constituting a cylinder for a small piston or plunger 31. At the top of this bushing is a flange to which is screwed a cap 32 containing an electric resistance designated as a whole by the reference character 33. This resistance or resistance device, which is utilized in connection with the measuring instrument to be referred to presently, consists of an upper diaphragm 33ª, a lower diaphragm 33ᵇ, and finely divided resistance particles 33ᶜ arranged between and filling the space between the two diaphragms, both diaphragms being insulated from the surrounding metal parts. Between the piston 31 and the lower diaphragm 33ᵇ is a coil spring 34 which transmits variable pressure between the piston 31 and the lower diaphragm so as to flex the latter different amounts.

It will be understood that as the position of the annular piston 23 is varied by a change in the load supported by the hook 20, the piston 31 will rise or fall and will vary the flexure of the lower diaphragm 33ᵇ and consequently the electric resistance between the two diaphragms, in direct proportion to the variation in load on the hook.

In connection with the variable resistance member carried by the block, I employ an electrical weighing instrument 35 which may be located at any desired point with reference to the resistance member, and at any point more or less remote therefrom. For example, the instrument may be located in the cab or station occupied by the operator of the crane or hoisting mechanism. This instrument is somewhat similar in construction to an ordinary volt meter, but will of course be graduated in pounds. The instrument is connected by conductors indicated at 36, to a battery 37, and to the variable resistance member 33, one of the conductors being connected to the lower diaphragm and the other to the upper diaphragm. If the instrument is located at a point remote from the block, the conductors 36 may be wound upon and unwound from a suitable drum 38, which will of course pay out and wind in the conductors at the same rate that the block 11 is lowered or raised relative to the crane 10.

With the arrangement and construction above described, the weight of the load supported on the hook at any time is indicated on the instrument, and at the same time the weighing is accomplished in a simple and very effective manner.

Having thus described our invention, what we claim is:

1. In combination with a hoisting apparatus having a frame and a load supporting member, means for weighing the load supported by said member comprising an electrical measuring instrument, a controlling device associated with said instrument, a pressure actuated device associated with said controlling device, a cylinder and piston to the latter of which the load supporting member is connected, and means for transmitting pressure from the said cylinder to said pressure actuated device.

2. In combination with hoisting apparatus having a frame and a load supporting member, means for weighing the load supported by said member comprising an electrical measuring instrument, a variable electrical device carried by the frame and connected to said instrument, and means for varying said device to a degree dependent upon the load supported by said member comprising a cylinder and piston to one of which the variable electrical device is operatively connected, a cylinder and piston to one of which the load supporting member is connected, and means for transmitting pressure from the part connected to the load supporting member to the part connected to the variable electrical device.

3. In combination with a hoisting apparatus having a frame and a load supporting member, said frame having a cylinder formed therein, a piston in the cylinder, the load supporting member being carried by the said piston, a second cylinder in the frame, the second cylinder and first mentioned cylinder being connected by a fluid filled passageway, a piston coöperating with the second cylinder, a pressure rheostat, the second mentioned piston forming a part of said rheostat, an electrical measuring instrument, said instrument being electrically connected with the rheostat.

4. In combination with a hoisting apparatus having a frame and a load supporting member, means for weighing the load supported by said member comprising an electrical measuring instrument, a variable resistance device carried by the frame and connected with the said instrument, and means for varying the resistance in said device in accordance with the load supported, comprising a well formed in the frame and a piston which supports the load, a second well formed in the frame, and connected with the first mentioned well by a fluid filled passageway, a piston in said second mentioned well, and operatively connected with the resistance device.

In testimony whereof, we hereunto affix our signatures in the presence of witnesses.

CLEMENT E. BEARD.
WALTER G. STEPHAN.

Witnesses for Clement E. Beard:
WILLIAM O. WALLACE,
RAY W. BELL.

Witnesses for Walter G. Stephan:
S. F. AGNEW,
A. F. KWIS.